Figure 15:
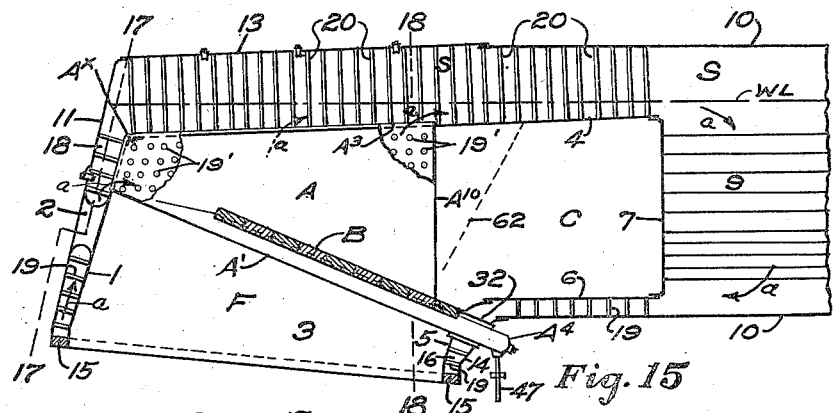

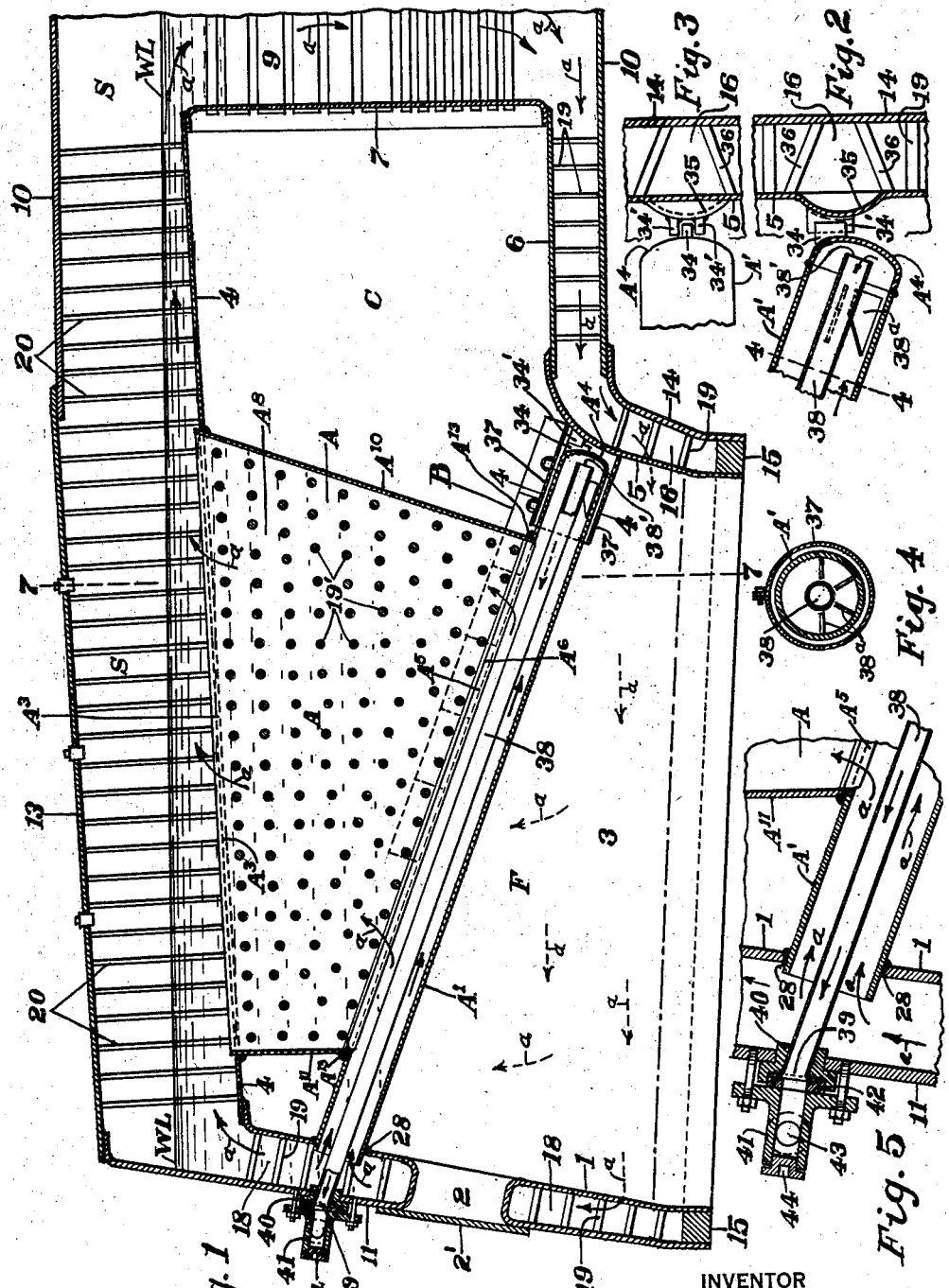

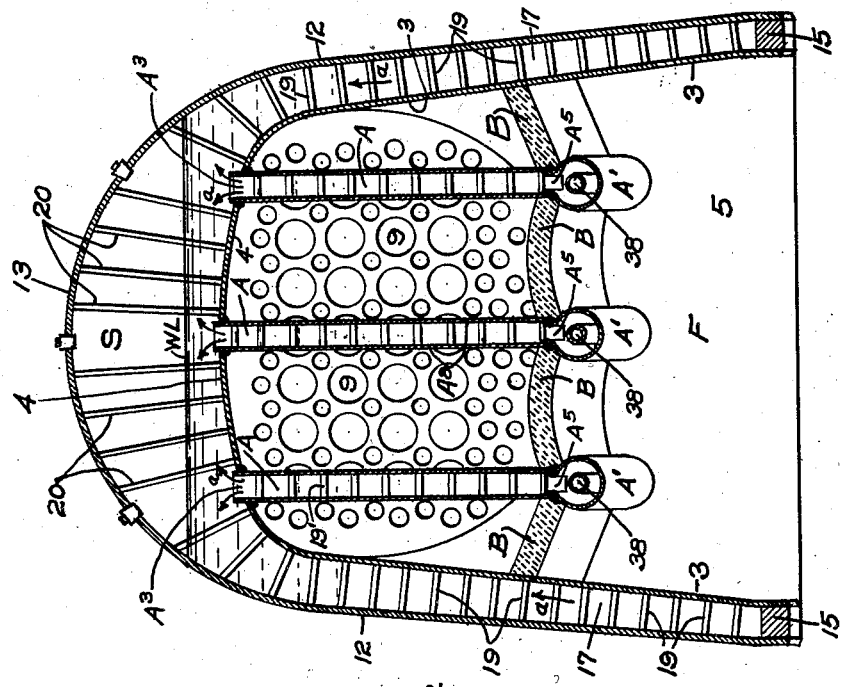
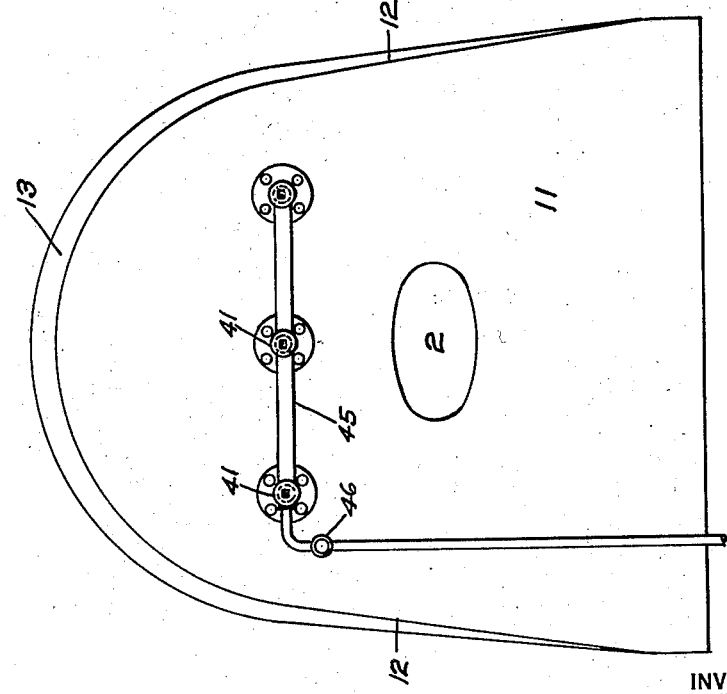

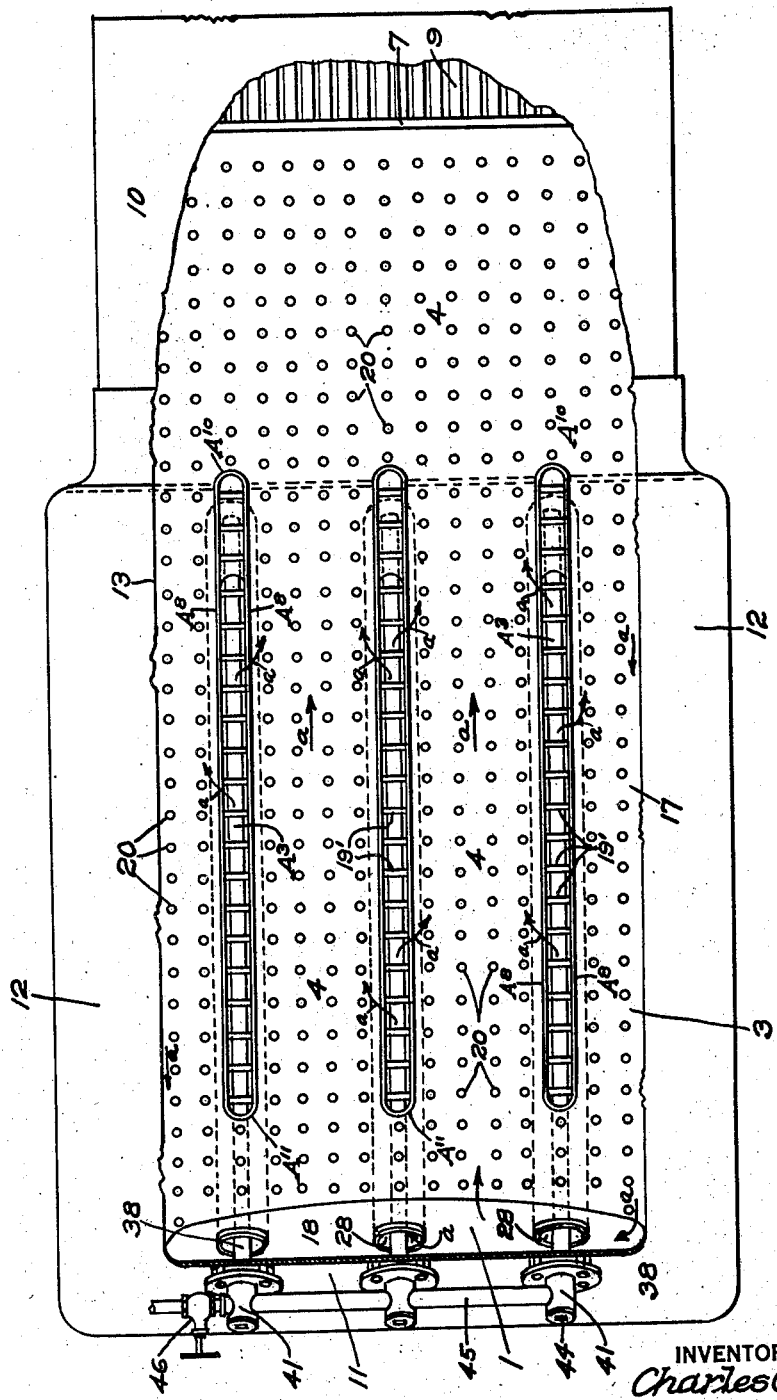

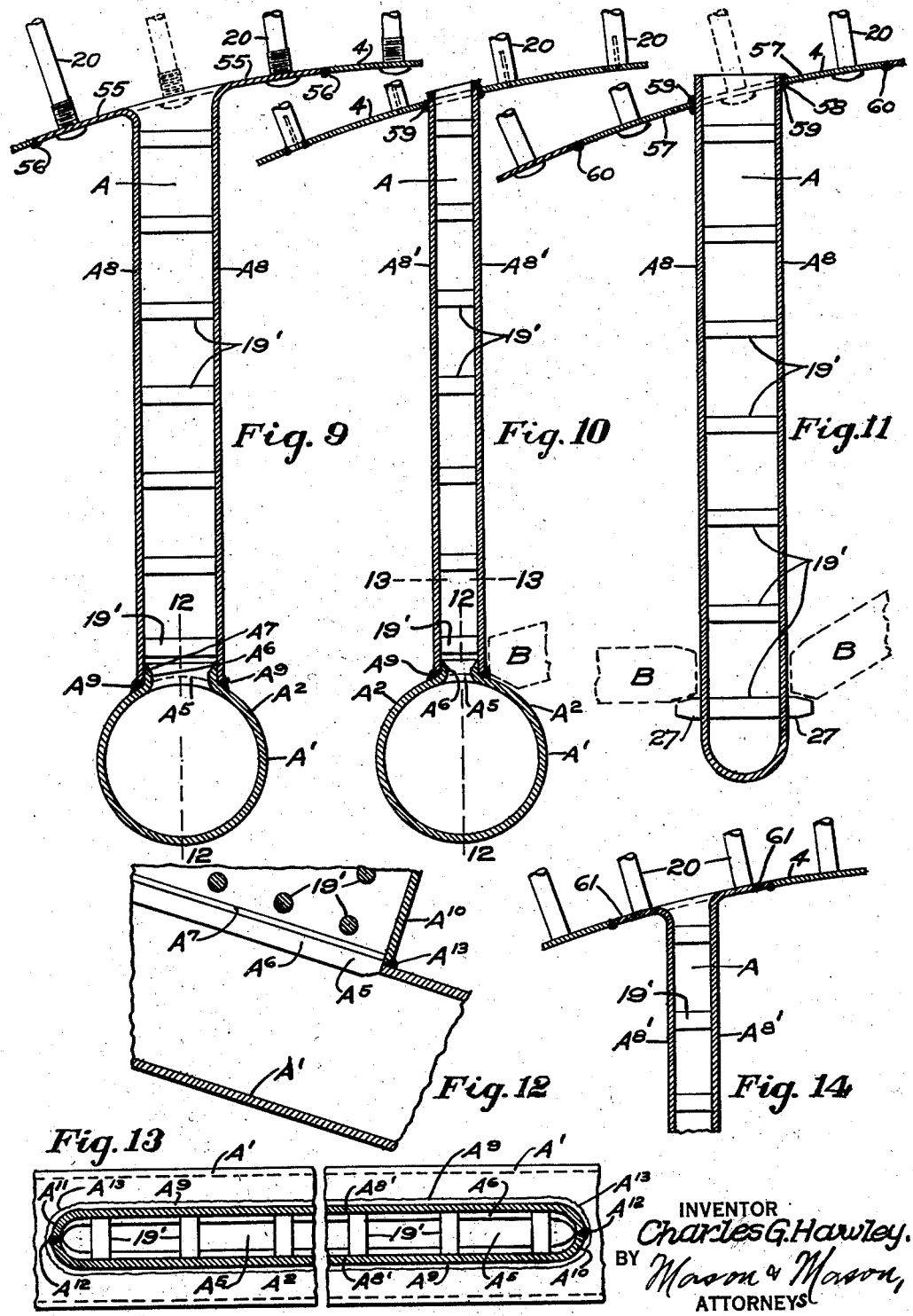

May 11, 1937. C. G. HAWLEY 2,080,269
LOCOMOTIVE BOILER
Filed June 1, 1936 6 Sheets-Sheet 5

INVENTOR
Charles G. Hawley.
BY Mason & Mason,
ATTORNEYS

Patented May 11, 1937

2,080,269

UNITED STATES PATENT OFFICE 2,080,269

LOCOMOTIVE BOILER

Charles Gilbert Hawley, Chicago, Ill., assignor to Harry H. Pinney, Cleveland, Ohio Application June 1, 1936, Serial No. 82,953

15 Claims. (Cl. 122—68)

The invention relates to improvements in locomotive boilers, particularly in the internal (stayed) fireboxes thereof.

The invention has many objects and effects, all having to do with the provision of locomotive boilers of lessened original and maintenance cost, of improved steaming capacity and efficiency, and of greater safety.

Another object of the invention is to increase the radiant heat-absorbing surface of a locomotive firebox and to thereby increase the activeness and the efficiency of the boiler. A better circulation of the boiler water results and improves the performance of all parts of the boiler. To these ends this invention employs water-steaming-and-circulating-walls within the firebox; and does so in a manner which counteracts or avoids the destructive effects of expansion and contraction therein. Chiefly, and as will become apparent, the rigid connection of widely separated parts of the firebox is here completely avoided.

A further object of this invention is to provide uniform boiler water circulation upon all parts of the firebox and to thereby increase firebox efficiency and avoid the cracking of firebox sheets, with attendant costs and dangers. Under this invention the water-steaming-and-circulating-wall receives water through the rear end of the firebox rather than from the front end or the side thereof. This simple rearrangement compels an active flow of water rearwardly along the sides of the firebox and across the rear end thereof, thus properly distributing the boiler water to all parts of the firebox.

Another object of the invention is to employ internal water-steaming-and-circulating-walls, commonly called thermic syphons, in a manner which shall cause them to be supplied with water of high heat content, ready for prompt conversion into steam; to the end that the locomotive shall be a "quick steamer" as well as being of high efficiency. Hereunder, this is accomplished by supplying the water-steaming-and-circulating-walls with water that has already traversed, and received heat from, the other firebox sheets. The arrangement next above mentioned embraces this improvement.

As will appear, in addition to making these water walls effective, safe and dependable, this invention distinctly improves the construction thereof, lessens their cost, and makes them easily installable in fireboxes.

Still another object of this invention is to make definite provision for either continuous or intermittent discharge (blow off) of the solids that enter and develop within such water-circulating-and-steaming walls. To this end suitably valved means are herein provided whereby scale-forming solids may be discharged from the lowest part of the water-circulating-wall, whenever and as frequently as desired. By so doing, the water walls and the boiler as a whole are kept at a point of high safety and efficiency, and the cost of boiler upkeep is lowered.

This invention is specially concerned with the prevention of disaster when the level of the boiler water falls or sinks below the top of the firebox. Such disaster is prevented by spraying or wetting all but a limited part of the then exposed area of the crown sheet. In that limited part, the crown sheet is allowed to overheat and to sag or blow down from a few of the crown bolts, affording openings through which the steam in the boiler may slowly and safely escape. Thus an explosion is avoided. Hereunder the said limited part of the crown sheet is definitely located and the crown bolts belonging thereto permit the red hot sheet to sag, in the selected part.

It is to be understood that the invention provides this safety feature by the employment of one or more water-steaming-walls which open upward and from which fountains of water are thrown upon the crown sheet when the boiler water level sinks to the point of otherwise leaving that sheet bare and unprotected.

Still further objects, effects and constructions will be pointed out hereinafter.

The invention consists in the methods, uses, constructions, associations and elements above-mentioned and hereinafter more fully described. All thereof will be readily understood upon reference to the drawings that accompany and form parts of this specification.

Figure 16:
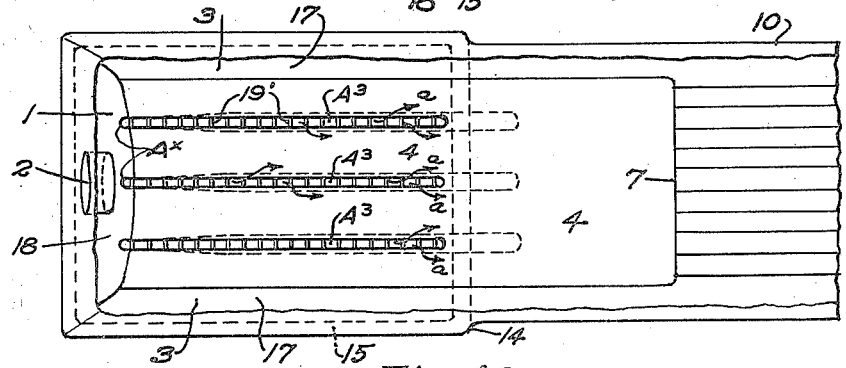
Figure 17:
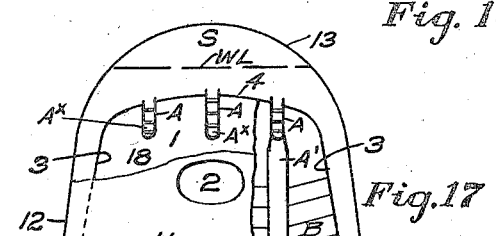
Figure 18:
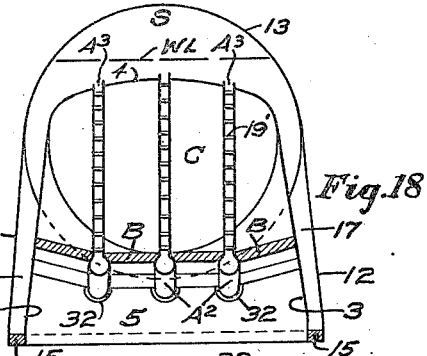
Figure 19:
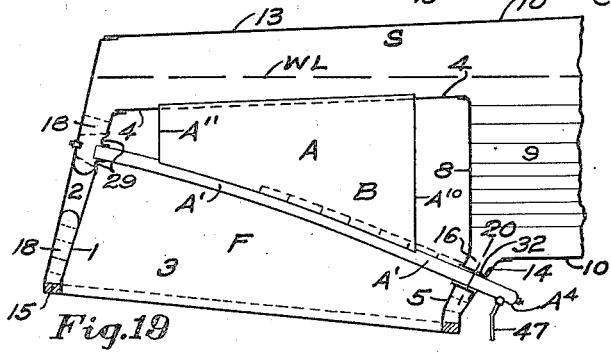
Figure 20:
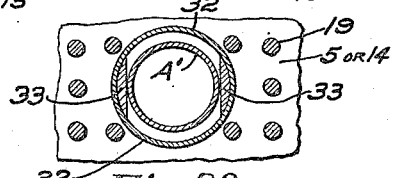
Figure 21:
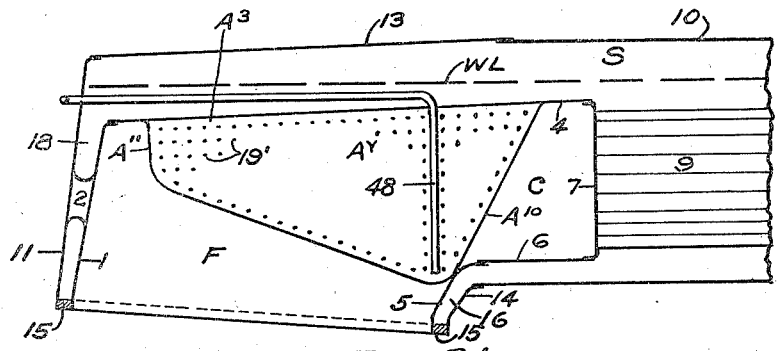
Figure 22:
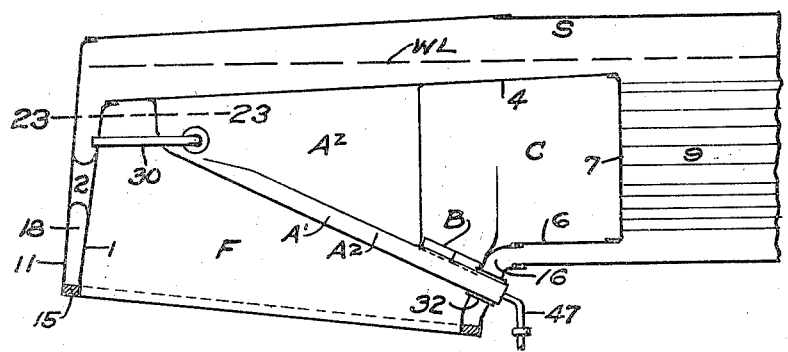
Figure 23:
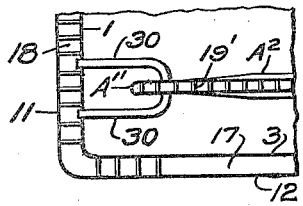

In said drawings, Fig. 1 is a vertical longitudinal section of a locomotive boiler and firebox exemplifying this invention; Fig. 2 is an enlarged vertical section of the lower part of the novel water-steaming-wall shown in Fig. 1 and in addition illustrates a firebox throat sheet of novel design; Fig. 3 is a plan view taken from Fig. 2; Fig. 4 is a cross-section on the line 4—4 of Fig. 2; Fig. 5 is an enlarged vertical cross-section illustrating the rear end of the water wall and the arrangement of a blow off pipe therein and in the rear head of the boiler; Fig. 6 is a rear end view of the boiler, taken from Fig. 1 and showing blow off connections such as above referred to; Fig. 7 is a cross-section of the firebox substantially on the line 7—7 of Fig. 1; Fig. 8 is a plan view taken from Fig. 1, the top of the boiler casing being broken away to disclose the crown sheet of the firebox; Figs. 9, 10, and 11 are vertical cross-sections illustrating several of the forms in which the novel water walls or steaming pockets are made hereunder; Fig. 12 is a vertical section upon the line 12—12 of Figs. 9 and 10; Fig. 13 is a horizontal section on the line 13—13 of Fig. 10; Fig. 14 illustrates a modified form of the upper portion of the water wall shown in Fig. 10; Fig. 15 illustrates a modified form of this invention in which the whole, but limited, rear end of a water wall may open through both the back sheet and the crown sheet of the firebox and wherein the forward, lower part of the water wall is of a necked formation and passes loosely through an opening provided therefor in the throat portion of the boiler; Fig. 16 is a fragmentary plan view taken from Fig. 15 and disclosing the crown sheet, the firebox, the water walls and other parts belonging thereto; Fig. 17 is an end and sectional view of the firebox, partly upon the line 17—17 of Fig. 15; Fig. 18 is a cross-section substantially on the line 18—18 of Fig. 15; Fig. 19 is like unto Figs. 1 and 15 but also discloses a water wall having a curved or cambered bottom portion; Fig. 20 is an enlarged cross-section on the line 20 of Fig. 19. Fig. 21 illustrates a further modification in which the water wall becomes a plain pocket merely depending from but still opening through the inclined crown sheet of the firebox; Fig. 22 illustrates the adaptation of this invention to a water wall of a form made familiar in the Nicholson thermic syphon; Fig. 23 is a horizontal section on the line 23—23 of Fig. 22; Figs. 24, 25, 26 and 27 are fragmentary vertical, longitudinal sections illustrating different methods of forming the lower parts of the water walls with respect to the throat of the firebox and for discharging solids or sludge from these water walls.

The drawings illustrate the rear ends of several locomotive boilers, each containing an internally stayed firebox of conventional form. Fireboxes of both plain and combustion chamber types are shown, requiring slightly different treatments to ensure safety and highest efficiency. The invention is applicable to fireboxes of still other kinds and is such that it does not require change in the shapes of either boiler or firebox; in brief, the invention finds its values in the improvement of all boiler parts in the matters of weight, cost, strength, durability and dependability, and in bettered performance, extended life, increased efficiency and operating safety.

The fire sheets of a locomotive firebox are tightly joined throughout and comprise a back sheet 1, side sheets 3, 3, a crown sheet 4, a throat sheet 5 and a flue sheet. As shown, the crown and side sheets may be extended and with a bottom sheet 6, may constitute a so-called combustion chamber, C. In such cases the flue sheet, marked 7, is positioned well forward of the throat sheet 5. In contrast, a plain firebox is typified by a flue sheet 8, which is an upward extension of the throat sheet 5, as well shown in Figs. 19, 24, 25 and 26. During operation the fire is maintained in the space defined by these sheets and the gases depart by way of the flues 9.

The pressure vessel or boiler shell, which contains the firebox, is characterized by a cylindrical shell or barrel portion 10, terminating in a front flue sheet (not shown). At its rear end, the boiler shell takes the form of, but is larger than, the enclosed firebox. That portion of the shell comprises a boiler head 11, a wrapper plate presenting flat sides 12 and a curved top 13. The shell portion is completed by an outside throat plate 14, which joins the lower part of the boiler barrel 10. The vertical sheets identified are united at the bottom, as by the rectangular frame 15, called a "mud ring" or foundation ring.

As shown, the fire sheets and the boiler shell are spaced apart, thus providing the throat space 16, the side water legs 17, 17 and the back water leg 18. The crown sheet 4 and the wrapper top 13 are more widely separated and thus afford space for both water and free steam; and normally both firebox and flues are submerged in boiler water. The space above the water level is termed the steam space, S, and varies with the position of the water level. The water level, otherwise known as the steam disengagement surface (marked WL), is normally maintained well above the crown sheet 4. If through inattention or other fault that level is allowed to fall below the top of the firebox, the latter is bared and becoming overheated is apt to collapse due to the pressure of the steam above it. As will become apparent, a chief function of this invention is to keep the crown sheets sprayed or filmed with boiler water at such times, and to thereby prevent the ripping or the rupture of the crown sheet, it being obvious that the crown sheet cannot become overheated so long as it is covered or filmed with water.

The back sheets 1 and 11 together contain the fuel door opening 2, for which a door 2' is provided.

All of the fireboxes shown are of the wide type but the invention is not limited thereto. Instead it is applicable to stayed fireboxes of all cross-sectional forms and shapes.

It will be noted that the crown sheets of these boilers are slightly inclined, the high point in each case being at the front end of the firebox. This is typical of locomotive practice, having to do with keeping all parts of the crown sheet easily covered with water, notwithstanding the surging and tipping movements of the locomotive. However, the invention is not limited to an inclined crown sheet, save in the instance of Fig. 21, to which further reference will be made.

Obviously, all of the sheets of the firebox are subjected to the pressure of the steam within the boiler and to prevent distortion, it is necessary to connect the opposed fire and wrapper sheets. The connections are rods, the shorter of which, marked 19, are termed stay bolts, while longer rods, marked 20, are called crown bolts. Next, the fire sheets which make up the firebox proper must transmit the heat of the internal fire to the water surrounding the firebox and as the fire temperatures are high, if burning is to be avoided the fire sheets are necessarily made thin; necessitating a close spacing of the stay and crown bolts.

For easy identification the novel water walls hereof are marked A, throughout the drawings. These are hollow, flat sided and hence staybolted devices in the nature of narrow, deep pockets which hang from the crown sheet 4. Each such hollow wall is closed at the bottom but at the top it opens through the crown sheet so that both water and steam may freely ascend into the overlying space, S.

These walls occupy longitudinal, vertical positions in the firebox and obviously provide longitudinal slots A3 in the crown sheets. One or several thereof may be so positioned, the number being determined by the width and shape of the firebox wherein they are installed.

It will be noted that the lower part of the firebox is not changed and that these water walls, A, occupy only the upper part of the firebox; leaving a fire chamber, F, which extends from side to side and from end to end of the firebox. The bottom of the firebox may contain a grate for the burning of solid fuel or may be constructed for the burning of oil.

The first function of the water wall or walls is to subdivide the flame normally rising from the lower part of the firebox and to thus increase the radiating surface of the flame and at the same time increase the extent of the walls that are to receive both radiant and convected heat from the burning fuel.

In longitudinal side elevation each wall, A, is of generally triangular shape. In this respect they closely resemble the water walls or thermic syphons now in common use, but in other respects they differ widely therefrom, as will become apparent.

The water walls herein presented may be of various cross-sectional shapes, as suggested by Figs. 9, 10, and 11, to which detailed reference will be made.

In addition to serving as water and steam-generating courses, these water walls usually also are shaped to serve as supports for the brick arch marked B. This in part explains the general triangular shape of this water wall, for, as shown, the arch or baffle, B, extends crosswise of the firebox and rearwardly and upwardly from the throat sheet 5 of the firebox, to a level above the fire door 2. Such arch prevents direct passage of products of combustion to the flues and forces the flames to move rearwardly before they can begin their travel toward the flue sheet, the arch materially lengthening flame travel and promoting better combustion within the firebox.

To prevent misunderstanding with reference to the triangular shape of the water wall, as next above mentioned, it is to be understood that that shape is more directly and importantly related to the action of the water, which enters through the rear end of the water wall, and is also directly related to the collection of the solids which are to be blown out, all as fully explained hereinafter.

As a convenience in the support of the arch brick B it is usual to provide each water wall with a bulging tubular bottom portion, $A^1$, thereby providing side ledges, $A^2$, upon which the ends of the brick may rest. The bulging bottom portion of the water wall is also advantageous in distributing the water as it enters the wall, as will be explained. However, the bulging bottom referred to is not an essential element of this invention. Instead, the wall may partake of other cross-sectional forms, for example, that which is illustrated in Fig. 11, where the wall comprises a simple folded sheet. In such cases, the support of the arch B is accomplished by providing the U-shaped wall with a plurality or row of arch supporting studs 27.

Before entering upon the description of the more important features of the invention which relate to the general construction, position and operation of these water walls, attention is directed to the novel construction thereof which is preferred hereunder. These details best appear in Figs. 1, 7, 9, 10, 12, and 13. By preference, the bottom portion of the water wall, marked $A^1$, comprises a seamless tube; the lower end of which is closed, as by a cap $A^4$, while the upper, rear end is left open. The top of this tube contains a long slot, $A^5$, which is formed by slitting that top and bending the edge portions, $A^6$, upward as well shown in Figs. 9, 10, 12, and 13. When the edges have been thus formed, they are scarfed or beveled, see $A^7$, and are then ready to be joined to the side plate portions $A^8$ of the water wall.

Those side portions $A^8$ extend vertically between the inclined tubular bottom $A^1$ and the crown sheet 4 of the firebox, being joined to the latter in either of the ways hereinafter pointed out. The side plates or sheets $A^8$ are coextensive with the slot $A^5$ in the top of the tube and the lower edges thereof closely fit against the turned-up scarfed edges, $A^6$. Having been placed as shown, the lower edges of the plates are joined to the top of the tube by autogenous welds, $A^9$. It is to be noted that the spaced flat plates $A^8$—$A^8$ are joined by many short bolts 19' and that the lower-most bolts 19' are placed directly above the scarfed tube edges $A^6$. Ample strength is thus ensured. Further, the front and rear edges, $A^{10}$ and $A^{11}$, of the side sheets $A^8$ are bent toward one another and are united by autogenous welds $A^{12}$, as well shown in Fig. 13, and at the bottom are welded to the top of the tube, as at $A^{13}$ in Fig. 12. A peculiar advantage of the described system of making the water walls is that such hollow walls or water legs are of low cost, of clean internal construction, and particularly this system admits of the use of bottom portions $A^1$ which are either straight or cambered. (Compare Figs. 1 and 19.)

The curving or cambering of the tubular wall-bottom next above-mentioned, is sometimes required as a means of increasing the fire space, F; in other words, enlarging the space beneath the arch, B.

Clearly, the described tubular wall element A', being an initially independent part is originally straight and may remain straight, or it may be readily bent into any desired form and suited to any desired general inclination within the firebox. Next, the fire sheet portions $A^8$ of the water wall being also initially independent elements, may be readily shaped, staybolted and suited to fit any space remaining between the crown sheet and a tubular part A' of any given and convenient inclination. These matters are of practical importance for thereby it becomes an easy matter to suit this water-steaming-and-circulating wall to the back sheet and to the crown sheet of any firebox. No firebox need be specially designed to receive such water walls.

It is to be noted that the described assembled and welded water walls are convenient, strong, durable and dependable, and in addition, are easy of repair.

As represented by the drawings, the bottom portions of these water walls may be of different lengths, the length of each being determined by that of the firebox, by the extent of the brick arch, B, to be used, and particularly, by the method hereunder selected for discharging solids or sludges from the lower part of the water wall. As about to be described, the structure may be confined to the firebox or may extend outward thereof; and sludge may be discharged therefrom in any convenient manner and direction, the blow off method selected being conveniently determined by the shape of the firebox, and the engineer's choice.

It will become apparent that most of the boiler water solids that enter these walls are gathered in the lower forward corners thereof and while active circulation of water may be depended upon to discharge such solids upwardly and upon the crown sheet, it is safer and more satisfactory to discharge them directly from and as quickly as they collect in the lower forward corner of the water wall. Means for so doing are herein provided. Best results are secured by providing a relatively quiet retention of the solids in the lower part of the water wall until intentionally discharged. To ensure such quiet, no outside water is permitted to enter that part of the water wall; whereas, commonly, like water walls are always in tubular and mechanical connection with the throat or other lower part of the boiler, directly receiving water therefrom. The above mentioned freedom from circulatory connection with the lower part of the boiler is an important characteristic of the present invention. Of still greater importance is the fact that the water wall of the invention is free to expand and to contract, rise and fall with the back and crown sheets of the firebox; without limitation to or restriction by any of the lower forward parts of the firebox. While the lower forward corner of the present water wall may closely approach or may even loosely pass through the lower part of the firebox, there is no rigid connection to prevent its free movement either longitudinally or vertically. This complete freedom is most advantageous for by reason of this freedom all disruptive strains within and upon the water wall are avoided and long operating life is ensured. The present water wall is fixedly attached to the crown sheet of the firebox and as about to be explained may be attached also to the rear sheet of the firebox but no rigid connection is employed or permitted between the lower part of this water wall and any forward part of the firebox which is distant from the crown sheet. Thus, very common faults and many difficulties are avoided; and also the cost of installing such water walls is reduced.

The attention is now directed to that important feature of this invention which provides for supplying or feeding boiler water into these water walls only after the heat content of the water has been increased nearly to the point of becoming steam. The purpose in so doing is to better the steaming qualities of the boiler and this is accomplished by supplying these water walls with water which is taken from the back water leg of the firebox or at least from the rear end of the firebox. The thermic operation of this water wall is very active and an attendant advantage is here to be observed; namely, the circulatory movement of the water in the boiler is thus made to actively include all of the side and rear parts and heating surfaces of the firebox and by this simple provision many difficulties hitherto experienced with those parts are avoided. The circulatory water movement is shown by the arrows $a$. The characteristics above noted are common to all of the constructions herein shown; that is, the upper rear end of each water wall, except in the case of Fig. 21, opens directly into and out of the rear water leg 18 of the firebox, taking water from that point.

The connection between the back water leg of the firebox and the described water wall is best established by extending the open upper rear end of the tubular element A', through an opening 28, in the back plate 1. By preference, the tube and plate are joined by an autogenous weld, the sheet 1 being sufficiently flexible, and slight movement occurring at that point. If desired the joint may be protected by employing a flexible diaphragm portion 29, as indicated in Fig. 19, employing a conventional arrangement of stay bolts therefor. In either case, an amply large water entrance opening or passage is provided between the back water leg 18 and the interior of the water wall A. Such tubular connection may be straight or bent. Though most convenient, the tubular connection is not essential hereto. Instead, the whole open upper rear end of the water wall may be extended through and welded to the back sheet 1, as well as to the crown sheet. That construction is well shown in Figs. 15, 16, and 17 wherein the open rear end of each water wall is marked AX.

As will be observed, the vertical extent of the rear end of the wall, in relation to the back sheet 1 of the firebox, is best limited to the space above the fire door 2 and the front end of the water wall may move freely with the crown sheet and yet occasion very slight movement at the rear end of this water wall. As will be evident, that connection is never subjected to perceptible strains and hence is very durable.

When, as explained, the water level WL in the boiler falls below the top of the crown sheet the water still continues to fountain upward from these water walls, wetting the crown sheet and preventing its collapse. At times the water may be allowed to fall to very low levels and it is desirable to then continue the wetting of the crown sheet. The relatively low opening between the back water leg 18 and the water wall ensures the continuing supply of water until the level reaches the lower part of that opening. Very low water levels are not to be expected for at any moment after the top of the firebox is bared, one or more of the stay bolt connections at the front of the firebox may give way and, as explained, promptly admit water and steam to the fire chamber, thus damping the fire and giving notice that the fire must be drawn.

Therefore the water connection between the rear leg and water wall may be safely fixed at any point or level above the fire door 2. Lower levels are inadvisable as the depth of the connection should be limited to avoid too great angular strains between the wall and the back sheet 1.

Fig. 21 may be referred to as representing a less advantageous application of the present invention in respect to the sure supply of water to the interior of the water wall or pocket. In Fig. 21 that pocket is marked AY. Here advantage is taken of the inclination of the crown sheet, the water normally pouring into the pocket AY through the rear end of the slot A3 in the crown sheet. In other respects the operation of the water wall is as before described but obviously this construction cannot be depended upon to fully "protect" the crown sheet after the water level gets to be lower than the rear end of the crown sheet.

Figs. 22 and 23 illustrate a firebox equipped with a water wall AZ shaped like the thermic syphons now in use. However, its bottom element A' is closed at its lower forward end and is not joined to the throat 16 of the boiler. Instead, tubular connections 30 are provided between the firebox leg 18 and the upper rear part of the water wall AZ.

While the water that falls into the rear ends of these water walls is in a highly heated state, it is nevertheless always very much heavier than the steam which is generated within the wall and therefore in each case the water sinks to the bottom of the water wall; in other words, the entering water runs naturally downhill and in doing so, disengages and displaces steam bubbles from the internal surfaces of the wall, keeping the latter covered with water and tending always to sweep settled solids into the lower forward corner of the water wall. The steaming action is very certain and swift and the boiler may therefore be depended upon for the prompt supply of steam to the locomotive engines.

It is preferred to prevent any considerable collection of solids in the water wall and hereunder each wall preferably is equipped with blow off means for discharging the solids in the water wall, while still held suspended in water and before they can become attached to the heating surfaces in the form of scale. The blow off means and appropriate water wall formations will now be described.

As above explained, the lower forward corner of the water wall hereof is always closed. It may terminate just short of the throat sheet as shown in Figs. 1, 21, 24, 26, and 27, in which cases the throat sheet is not disturbed. Or, the bottom element A' may be made to extend through the throat portion 16 of the boiler as shown in Figs. 15, 16, 17, 18, 19, 20, 22, and 25. The blow off connections whatever their kind, lead from the actual bottom corners of the walls and are arranged to discharge sludge outboard of the boiler. Several arrangements for the purpose are shown and will be described.

No fixed or non-flexible connection is allowed to prevent free vertical movement of the water wall; hence, as shown in Figs. 15 to 20, any extended neck portion thereof is accommodated within a sleeve 32, that is installed in the throat 16 of the boiler. That sleeve is of larger diameter than the neck portion, leaving the wall free to move without strain.

Should the water wall warp or move laterally in the firebox, the support of the brick B, might be endangered; hence as clearly shown in Fig. 20, the sides of such larger sleeve are provided with vertical guiding pads 33, which limit the lateral movement of the neck in the sleeve.

Next referring to Figs. 1, 2, and 3, it will be seen that a like lateral fixing of the water wall may be accomplished when the water wall A merely closely approaches the throat sheet of the firebox. For such cases a lug 34 is welded vertically on the wall end A4 and complementary lugs 34' are welded vertically on the adjacent firebox sheet. These lugs engage and laterally restrain the wall or element A but do not prevent its movement vertically.

Sometimes such engaged lugs must be applied in a position which would ordinarily cover some of the throat stays. It is better that the ends of the latter be left accessible and in such cases the fire sheet (see Figs. 1, 2, and 3) is then provided with a "self-supporting" bulge 35, to which the interlocking lugs are attached.

As shown, the inner ends of the stays 36 for such a bulged section may be placed where they are accessible beyond the end of the water wall. They should be "basketed" with respect to the outside throat plate 14, as well shown in Figs. 2 and 3.

Another valuable novelty of general utility may be here mentioned. When solids are allowed to gather in a wall corner wholly within the firebox and therefore subjected to the fire, as in Figs. 1, 24, 26, and 27, it is desirable that that corner portion be, at least in part, insulated or protected from the fire. The device prescribed by this invention is termed a "mud boot" 37, upon the lower end or corner of the water wall.

Various materials may be employed in making these mud boots but by preference and as shown in Figs. 1 and 4, the mud boot hereof comprises an easily renewable metal shield loosely fitting the corner portion of the wall and against the throat sheet of the firebox. This is a mere shield which prevents the overheating and burning of the corner of the water wall when and if solids are allowed to accumulate therein. Such mud boots may be applied to any of the exposed lower parts of the walls herein shown. They are of little cost, may be readily renewed and are of very practical value.

Not all fireboxes have throat portions that admit of the extension of the water wall neck outward beneath the barrel of the boiler, as variously depicted. It may be taken as understood that the construction shown in Fig. 1 is to be preferred above others.

The preferred arrangement for discharging sludge from the bottom of the water wall is likewise shown in Fig. 1. The same comprises a pipe 38, which is held centrally within the larger tubular element A1. This pipe is inserted through a centering block 40 provided on the boiler end 11 and extends nearly to the bottom of the water wall, where it presents an open end 38'. That lower end of the pipe 38 is held by convenient flights 38a which are welded into the interior of the part A1 before the end cap A4 is welded in place. The inner ends of the flights are beveled, as shown, and the pipe may be readily removed and replaced; a convenience when the boiler is to be washed.

Figure 24:
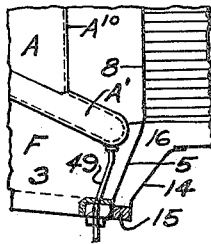
Figure 25:
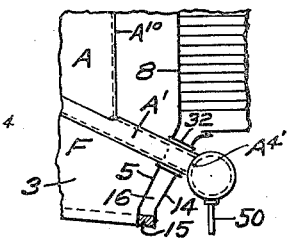
Figure 26:
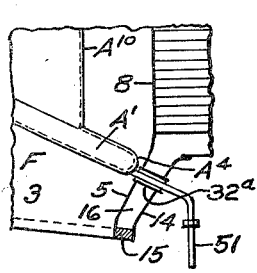
Figure 27:
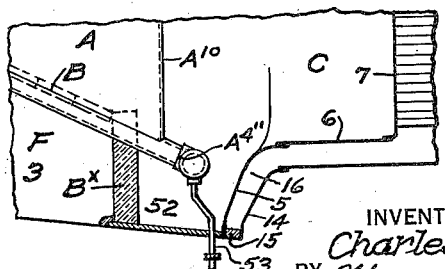

The upper end 39 of the pipe 38 is flared or beaded, to hold its position in the block 40 and is capped by a part 41, the latter containing the blow off opening 43 and being bolted against a suitable packing 42, placed between the parts 40 and 41. A washout plug 44 is conveniently provided in the end of the capping part 41 and as indicated in Fig. 6 the several blow off caps 41 may be joined by a header 45; and may be served by a single valved blow off pipe 46. However, a separate valved connection may be provided for each water wall A. During operation it is only necessary to open the valve 46, whereupon the solids that may have accumulated in the lower part or corner of the water wall will be discharged.

Where the forward end of the water wall extends through the boiler throat a simple valved pipe 47 is used to rid the wall of sludge, as represented in Figs. 15, 19 and 22. The pocket-like wall AY of Fig. 21 is best provided with an internal blow off pipe 48 which leads upward and thence rearward, through the rear head of the boiler. A wall which does not penetrate the boiler throat may be served by a valved blow off pipe 49 as shown in Fig. 24. This pipe is positioned within the firebox at the end of the grate and should be protected by brick work. Fig. 25 illustrates the novel application of a "mud drum" A4' to the lower end of the water wall or walls; such drum having its own blow off connection 50. Fig. 26 resembles Fig. 24 but the blow off pipe 51 leads outward through a small throat sleeve 32a. Fig. 27 illustrates a mud drum A4" for several water walls positioned in a long firebox.

The grate of such a firebox is shorter than the box itself and a brick wall BX is utilized to supplement the inclined arch B. The mud drum is positioned in the partially remote cinder pit 52 and a blow off pipe 53 leads downward therefrom.

The water not evaporated and rising upon the top of the firebox and particularly that which emerges from the herein described water walls is very hot and relatively light, having nearly reached the condition of becoming steam. From that point it moves forward beneath the disengagement surface WL. Losing heat in the forward part of the boiler, the water sinks or returns to the bottom thereof and then sweeps backward around the firebox, to receive further heat.

The upper parts of Figs. 9, 10, 11, and 14 are of interest because they show several acceptable methods of forming the water wall tops and uniting them with the crown sheet. In respect to its top the water wall of Fig. 9 resembles the top of the thermic syphon now in common use having lateral flanges 55 which fit within an opening arranged in the crown sheet 4 and which are welded thereto as shown at points 56. These flanges receive widely spaced rows of the crown bolts. An equivalent structure appears in Fig. 11, wherein a welded-in crown patch piece 57, is provided. That part itself contains a slot 58 wherein the top of the wall A is directly welded, welds 59 being used both above and below the patch 57. Clearly, that patch part is applied to the wall A in this manner before the wall is fitted into position and before the welds 60 are made. A very simple and stable structure results.

Upon comparison, the water wall A of Fig. 10 will be found to be much thinner than the wall of Fig. 9; yet the general construction is the same; and the closer spacing of the wall sides A6' has the effect of reducing the volume of contained water and correspondingly increasing the rate of water ascent. Obviously, the heating area of the wall is not diminished and the quantity of steam evolved in this thin or narrow wall will equal that produced in a thicker wall; hence the swifter ascent of the water. Also the scouring of the heating surfaces is improved. The thinner walls of Figs. 10 and 14 are advantageous because each may be applied to the crown sheet 4 by cutting a narrow slot in that sheet between any directly adjacent rows of crown bolts 20. In that case the welds 59 appear only on the underside of the crown sheet. A saving is effected; stability of the completed structure is ensured. Several of these advantages may be secured by providing the top of the thin wall with narrow flanges 61 for the reception of adjacent rows of stay bolts and to be welded into the crown sheet, as shown in Fig. 14.

The thin water walls here described, particularly such as have relatively large tubular bottom members A', are recommended for use upon the foregoing grounds. If it is found that the water is thrown too vigorously into the space S above the crown sheet, that is a fault readily cured.

Combustion chamber fireboxes present special problems by reason of the length of the combustion chambers. The front of the water wall may be extended well into the combustion chamber as shown in Figs. 1 and 21 and as also shown by the dotted line 62 appearing in Fig. 15.

From the foregoing description it will be apparent that this invention attains all of the principles and detailed objects which are set forth in the opening of this specification.

The operation of such improved fireboxes having been sequentially explained and the relation of each part to the other having been made plain, no summarization of the operation appears to be required.

Having thus described my invention I claim as new and desire to secure by Letters Patent:—

1. A steam boiler of the longitudinally extended locomotive type composed of a shell, internal flues and a stayed internal fire box, the latter comprising a door or back sheet, side sheets, a crown sheet which is inclined forwardly and upwardly and throat and flue sheets, suitably united, stayed to said shell, within one end thereof and forming therein a back water space, side water spaces, and a steam space above said crown sheet, in combination with a generally triangular internally stayed and open topped water-steaming-and-circulating wall or pocket which is positioned vertically and longitudinally within the upper part of said fire box, and which is attached to said crown sheet in open communication with said steam space, said pocket presenting a closed front end and a forwardly and downwardly inclined closed bottom terminating in a closed bottom corner portion, the latter positioned close to said throat sheet but free to move vertically with respect thereto.

2. The combination as claimed is claim 1 and having in addition means fixing the position of said closed bottom corner portion transversely with respect to said throat sheet.

3. The combination as claimed in claim 1 and having in addition means for discharging solids from said closed bottom corner portion of said pocket.

4. The combination as claimed in claim 1 and having in addition a refractory brick arch within said firebox and in part supported by said pocket.

5. A steam boiler of the longitudinally extended locomotive type composed of a shell, internal flues and a stayed internal fire box, the latter comprising a door or back sheet, side sheets, a crown sheet and throat and flue sheets, suitably united, stayed to said shell and spaced therefrom, said fire box forming therein a back water space, side water spaces, and a steam space above said crown sheet, in combination with a generally triangular internally stayed water-steaming-and-circulating wall or pocket positioned vertically and longitudinally within the upper part of said fire box and attached to the upper part of said back sheet and to said crown sheet in open communication with said back water space and said steam space, said pocket presenting a closed front end and a forwardly and downwardly inclined closed bottom terminating in a closed bottom corner portion near said throat sheet and free to move with respect to said throat sheet.

6. The combination as claimed in claim 5 and having in addition a tube leading from said closed bottom corner portion of said pocket for the discharge of water and solids.

7. The combination as claimed in claim 5 and having in addition a suitably valved blow-off pipe which leads from said closed bottom corner portion of said pocket.

8. The combination as claimed in claim 5 and having in addition a refractory brick arch in said fire box and in part supported by said pocket.

9. A steam boiler of the longitudinally extended locomotive type composed of a shell, internal flues and a stayed internal fire box, the latter comprising a door or back sheet, side sheets, a crown sheet, and throat and flue sheets suitably united, stayed to said shell and spaced therefrom, said fire box forming therein a back water space, side water spaces, and a steam space above said crown sheet, in combination with a generally triangular open-topped internally stayed water-steaming-and-circulating wall or pocket positioned vertically and longitudinally within the upper part of said fire box and attached to the upper part of said back sheet and to said crown sheet in open communication with said back water space and said steam space, said pocket presenting a closed front end and a forwardly and downwardly inclined closed bottom portion of bulging tubular formation and terminating in a closed bottom corner portion opposed to said throat sheet but free to move with respect thereto.

10. The combination as claimed in claim 9 and having in addition a blow-off conduit positioned centrally within the bulging bottom portion of said pocket, opening out of the closed bottom corner portion thereof and extending rearward and outward through the said back sheet and the boiler shell.

11. The combination as claimed in claim 9 and having in addition a blow-off tube positioned centrally within the bulging bottom portion of said pocket and removable through the end of the boiler shell, and a blow-off valve upon the exterior of the boiler.

12. The new article of manufacture comprising the hollow, open topped, generally triangular, internally stayed, water-steaming-and-circulating pocket or wall which has a closed front end and a downwardly and forwardly inclined closed bottom terminating in a closed bottom corner portion.

13. The article as claimed in claim 12 and having within itself means for the discharge of solids from said corner portion.

14. The open topped, generally triangular, water-steaming-and-circulating wall or pocket comprising a flat sided, hollow, internally stayed body portion and a tubular bottom portion presenting upturned flanges within the lower part of said body portion and against which the bottom edges of said body portion are welded.

15. A boiler firebox, its water legs, crown sheet and flue sheet, in combination with a hollow water wall depending from said crown sheet and opening upward therethrough; said wall being closed at the bottom and at the end nearest said flue sheet but open for the reception of water at the opposite end, a mud boot protecting the lower closed corner portion of said wall, and means for blowing sludge from the region protected by said boot.

CHARLES GILBERT HAWLEY.